3,203,806
FLAVORING FOR PET FOODS
Harland H. Young, Western Springs, Ill., assignor to Swift & Company, Chicago, Ill., a corporation of Illinois
No Drawing. Filed Aug. 8, 1962, Ser. No. 215,543
8 Claims. (Cl. 99—2)

This invention is concerned with improved food products and, more specifically, to the production of protein-carbohydrate food products having improved palatability, including improved flavor and odor.

Flavor and odor of food products represent two of the more important elements constituting what is generally considered palatability and acceptance, and this is particularly true in the case of pet foods. Food products especially designed for household pets such as dogs, cats, and other domesticated mammals kept for pleasure rather than for utility represent a substantial segment of what is generally referred to as the "pet food industry." Foods designed for such pets generally are made up of meat and meat by-products, fish and fish by-products, cereals and other nutritional ingredients in the form of wet, dry or semidry products. Such foods contain proteins and carbohydrates in substantial amounts and are marketed in cans, bags or flexible containers.

Acceptability of such product to both the pet and the pet owner are very important factors in the marketing of pet foods and it is important that any product designed for pets be acceptable to the owner, as well as appetizing and flavorful to the pet. Dog and cat foods specifically must be economical, nutritious, appetizing to the animal, and must not be objectionable to the owner insofar as odor is concerned.

It is, accordingly, an object of this invention to provide pet foods which possess a greater "pet acceptance" than those known heretofore.

It is another object of the invention to provide a method for treating formulated pet foods to impart to such pet foods more desirable flavor and odor characteristics.

Still another object of the invention is to provide pet foods having improved palatability and acceptance by the animal while retaining a high degree of owner acceptance.

Additional objects, if not specifically set forth herein, will be readily apparent to those skilled in the art from the detailed description of the invention which follows.

Generally, the invention involves the production of pet foods of the type containing proteins and carbohydrates possessing greatly increased palatability. This increased palatability is obtained by embodying in such pet foods a small but effective amount of a flavor enhancing additive. The additive which is an amide of acetic acid can be employed in very small amounts in the pet food to obtain a significant improvement in flavor as measured by animal preference or animal acceptability. Any of the various pet foods in the wet, dry or semidry form can be rendered markedly more appetizing by incorporating the additive into the pet food and the additive does not detract from the food in any manner inasmuch as it is compatible with all of the pet food ingredients.

More specifically, the invention relates to pet foods having flavor and odor highly preferred by dogs, cats, and other animals and, yet being substantially innocuous insofar as pet owners are concerned. The flavor and odor enhancer providing these unique results is acetamide or combinations of acetamide with small amounts of acetic acid. It is possible to obtain a significant improvement in pet acceptance of pet foods containing the flavor enhancer in amounts of only about 0.1% based on the solids present in the pet food. It is usually desirable to utilize about 0.1–0.5% based on the solids present in the food to insure that the increased palatability will be exhibited by a large number of individual pets. Although larger amounts up to around 1–3% based on the food solids can be employed to advantage, it is considered uneconomical to use more than about 1% since the increased benefits apparent in pet acceptance are not sufficient to justify the added expense.

Pet foods generally can be greatly improved by the flavor enhancing additive of the invention, but the invention has particular application as applied to wet, dry, and semidry foods which are marketed as canned cat or dog food or as dry cat or dog food. These pet foods are also utilized in feeding other domesticated quadrupeds. These pet foods usually contain a substantial amount of protein derived from meat or meat by-products, fish or fish by-products, and high-protein vegetable sources such as soybeans. Also present in substantial amount in such foods are carbohydrates provided by cereals and grains. The nutritional ration is also supplemented by the addition of minerals and vitamins. None of these ingredients is adversely affected by the additive of the invention and the additive is compatible with all of the ingredients of the pet food. Incorporation of the additive in the pet food can be effected at any point during the processing and formulation thereof as during the blending of ingredients or before or after drying in the case of dry foods. Distribution of the additive throughout the food can be accomplished by conventional means.

The flavor enhancing additive, as has been noted previously, contains acetamides as an essential ingredient, namely those amides produced by the acetylation of ammonia. Crude or impure acetamide containing a small amount of acetic acid and a mixture of mono-, di- and triacetamide is particularly effective. The standard methods for producing these acetamides in which acetic acid is produced as a by-product can be employed to produce the acetamide flavoring. Such methods include the reaction between acetic acid and ammonia, the distillation of ammonium acetate, the reaction between acetic anhydride and ammonia, and the amidation of esters of acetic acid with ammonia. In all of these reactions, with the exception of the amidation of acetic acid esters, an excess of acetic acid is present and the acetamide contains varying amounts of acetic acid. If desired, acetic acid can be added to the acetamide in an amount of about 10–100% based on the acetamide. Larger amounts can be employed but are not particularly useful inasmuch as flavor enhancement is not noticeably improved with these larger amounts.

The examples which follow show the composition of typical pet foods coming within the scope of the invention and, also, illustrate the effectiveness of the acceptance enhancer. These examples are intended to be illustrative and should not be considered to limit the invention in any manner.

Example I

Wet, dry, and semidry pet foods contain the following ingredients in the amounts noted:

| Ingredient | Wet | Dry | Semidry |
|---|---|---|---|
| Meat, meat by-products and other animal protein, percent | 20–35 | 10–40 | 30–50 |
| Fat, percent | 1.0–6.0 | 4.5–9.0 | 10–25 |
| Cereals (total breakdown), percent | 10–20 | 70–90 | 30–60 |
| Soybean grits or meal, percent | 8–12 | 25–40 | 10–15 |
| Wheat and/or barley, percent | 3–8 | | 10–15 |
| Corn and/or milo, percent | 2–5 | 30–60 | 10–15 |
| Others, percent | 0.5–2.0 | 2–5 | 2–8 |
| Minerals, in percent: | | | |
| Calcium (minimum) | 0.4 | 1.0 | 0.8 |
| Phosphorus (minimum) | 0.3 | 0.8 | 0.6 |
| Potassium (minimum) | 0.3 | 0.8 | 0.6 |
| NaCl (minimum) | 0.5 | 1.4 | 1.0 |
| Minerals, in percent: | (¹) | (¹) | (¹) |
| Iron | 8.0 | 22 | 16 |
| Copper | 1.0 | 2.5 | 2.0 |
| Magnesium | 70.0 | 200 | 140 |
| Manganese | 0.7 | 2.0 | 1.4 |
| Iodine | 0.2 | 0.5 | 0.4 |
| Vitamins: | | | |
| Vit. A units/lb | 600 | 600 | 600 |
| Vit. D units/lb | 80 | 120 | 100 |
| | (¹) | (¹) | (¹) |
| Vit. B12 | 0.004 | 0.01 | 0.008 |
| Thiamine | 0.1 | 0.3 | 0.2 |
| Riboflavin | 0.3 | 0.8 | 0.6 |
| Pyridoxine | 0.15 | 0.4 | 0.3 |
| Pantothenic acid | 0.4 | 0.9 | 0.8 |
| Niacin | 1.5 | 4.1 | 3.0 |
| Choline | 200 | 560 | 400 |

¹ In mg./lb. of feed.

In the case of wet foods, the additive in the amount of 0.2–0.8% based on the solids present in the pet food is incorporated into the ingredients during the formulation thereof. With dry or semidry pet foods, the additive is conveniently sprayed on the dry food from an aqueous solution just prior to packaging and at lower levels from 0.1 to 0.5%. The wet food was employed in dog acceptance tests, as follows:

A large batch of the wet food described above was divided into two equal parts. One part was held for use as a control and 0.2% acetamide based on the solids present in the wet food was added to the other part. The acetamide was added in the form of a water solution of acetic acid amides. One ration of the control food and one ration of the food containing acetamide was placed in the cage of each of sixteen dogs for three consecutive days. The control sample was located in the center of the cage and the acetamide-containing sample was placed at the outer edge of the cage on the first day. The second day the location of the samples was reversed and on the third day the samples were again transposed to the location of the first day. This laboratory test showed the following results:

| Sample | Preference | |
|---|---|---|
|  | No. | Percent |
| Control | 13 | 27 |
| Control containing 0.2% acetamide | 20 | 41.7 |

Fifteen dogs, or 31.3%, showed no preference.

In a similar test conducted by 145 dog owners on a commercial research basis, the following results were obtained:

| Sample | Preference percent |
|---|---|
| Control | 26 |
| Control containing 0.2% acetamide | 42 |

32% of the dogs showed no preference.

Similar results are obtained when the additive is incorporated in cat food containing a large amount of fish.

Obviously many modifications and variations of the invention as hereinbefore set forth may be made without departing from the spirit and scope thereof and, therefore, only those limitations should be imposed as are indicated in the appended claims.

I claim:

1. A method for improving the palatability and acceptance of pet foods containing animal protein comprising: embodying in such pet foods a small amount sufficient to improve palatability of said foods of acetamide and acetic acid.

2. The method of claim 1 wherein the acetamide is acetylated ammonia.

3. A method for improving the palatability and acceptance of pet foods comprising: incorporating in and distributing throughout a pet food containing animal protein as an ingredient thereof a small amount sufficient to improve palatability of said foods of acetic acid and a mixture of mono-, di- and tri-acetamides.

4. A method for improving the palatability and acceptance of pet foods comprising: incorporating in pet foods containing animal protein a small amount sufficient to enhance the palatability of said pet foods of a mixture of acetamides and acetic acid.

5. A carbohydrate-protein pet food containing meat protein designed for the feeding of domestic pets having incorporated therein a small amount sufficient to improve the palatability of said pet food of crude acetamide containing acetic acid.

6. A carbohydrate-protein pet food containing animal protein designed for the feeding of domestic pets having incorporated therein a small amount sufficient to enhance the palatability of said pet food of acetamide and acetic acid.

7. A method for improving the palatability of pet food containing meat by-products comprising: embodying in such pet food a small amount sufficient to enhance the flavor of said pet food of the amide reaction product of acetic acid and ammonia.

8. A method of improving the palatability and acceptance of pet foods containing animal protein comprising incorporating in said pet foods a small amount sufficient to enhance the palatability thereof of a mixture of mono-, di- and triacetamide containing a small amount of acetic acid.

References Cited by the Examiner

UNITED STATES PATENTS 2,295,643  9/42  Emery et al. _____ 99—2
2,718,467  9/55  Belasco et al. _____ 99—2

OTHER REFERENCES

Shaw: Feedstuffs (page 19), Sept. 12, 1959.

A. LOUIS MONACELL, *Primary Examiner.*

BEATRICE H. STRIZAK, *Examiner.*